United States Patent [19]

Walter

[11] 4,454,701
[45] Jun. 19, 1984

[54] ANCHORING OF MATERIAL TO CONCRETE

[76] Inventor: Fred A. Walter, 12310 W. Cold Spring Rd., Greenfield, Wis. 53228

[21] Appl. No.: 397,594

[22] Filed: Jul. 12, 1982

[51] Int. Cl.³ .............................................. E04B 1/38
[52] U.S. Cl. ........................................ 52/704; 52/98; 52/741; 411/78
[58] Field of Search ................... 52/698, 704, 741, 98; 411/75, 76, 78, 79

[56] References Cited

U.S. PATENT DOCUMENTS

| | | | |
|---|---|---|---|
| 63,558 | 4/1867 | Prentiss | 411/79 |
| 440,422 | 11/1890 | Dietrich | 411/78 |
| 1,400,248 | 12/1921 | Thomas | 85/38 X |
| 1,407,999 | 2/1922 | Harris | 238/294 |
| 1,695,113 | 12/1928 | Langton et al. | 85/8.1 X |
| 1,798,273 | 3/1931 | Pleister | 85/72 X |
| 2,878,668 | 3/1959 | Starling et al. | 72/105 |
| 3,191,864 | 6/1965 | Moses | 52/704 X |
| 3,680,430 | 8/1972 | Cannon et al. | 411/76 |
| 3,974,621 | 8/1976 | Stang | 52/758 |
| 4,275,637 | 6/1981 | Herb et al. | 411/78 |

Primary Examiner—Carl D. Friedman
Attorney Agent or Firm: Andrus Sceales, Starke & Sawall

[57] ABSTRACT

A simplified anchor for firmly connecting wood or the like to concrete. The anchor includes a pair of connector elements. One element comprises a fluted concrete nail having the usual head and is made of hard metal. The other element comprises a headless pin of soft malleable metal having a notch spaced from but adjacent one end to form a top portion. The tip of the nail is initially overlappingly joined to the notched top portion of the pin by an encircling retaining band. A hole is drilled through the wood and into the concrete to be joined and to a depth equal to the bottom end of the pin below the notch. The pin is inserted into the hole and the nail is then driven into the hole alongside the pin. When the nail head engages the notched top portion of the pin, the pin breaks away at the notch. The nail is then driven further until its head is engaged with the wood surface and the upper pin tip. During driving, the nail cuts into and deforms the pin within the hole in a tightening action.

6 Claims, 9 Drawing Figures

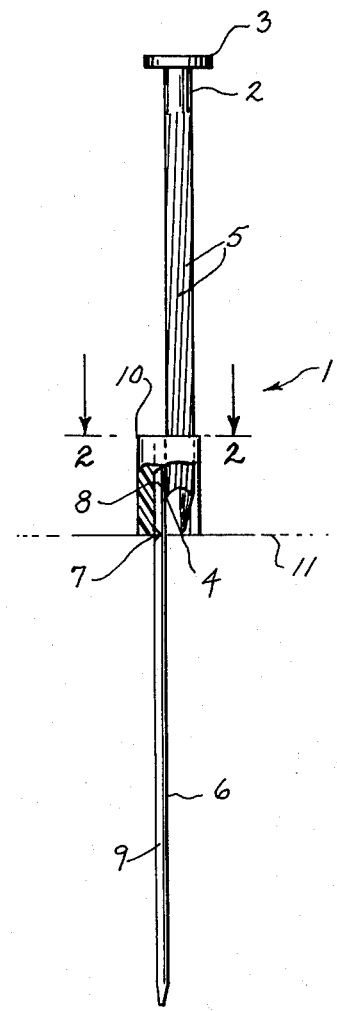
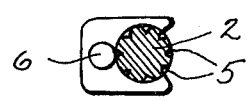
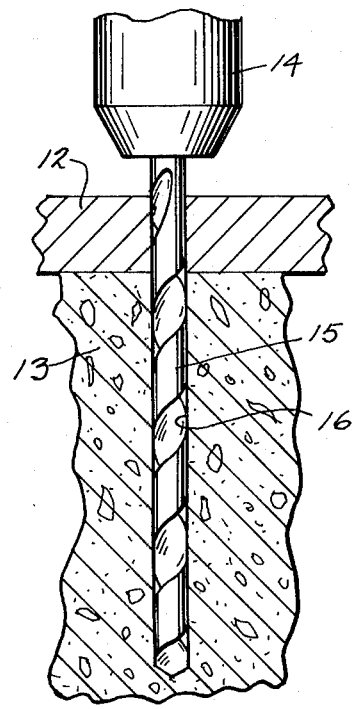
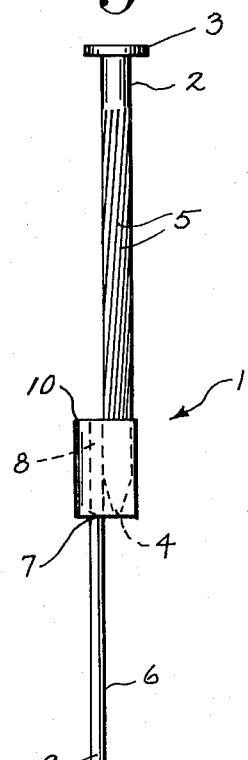
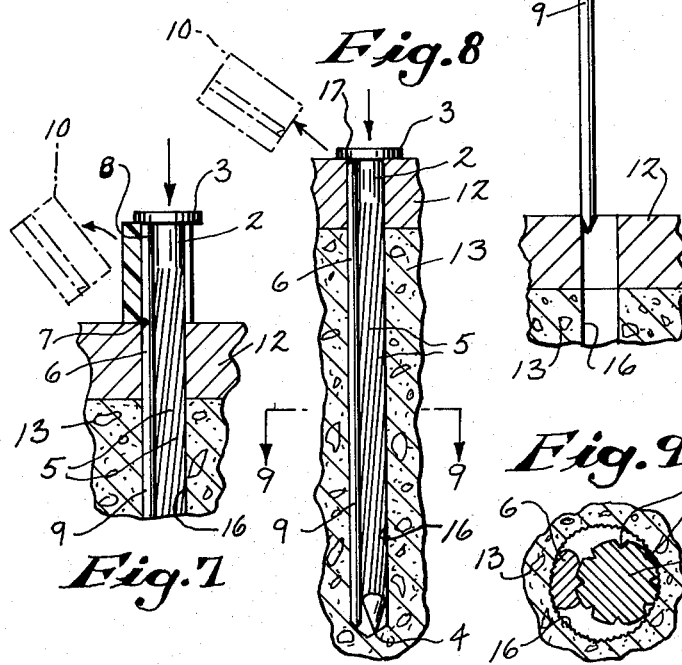
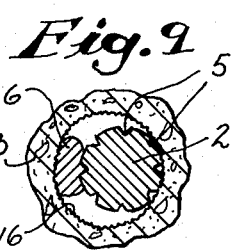
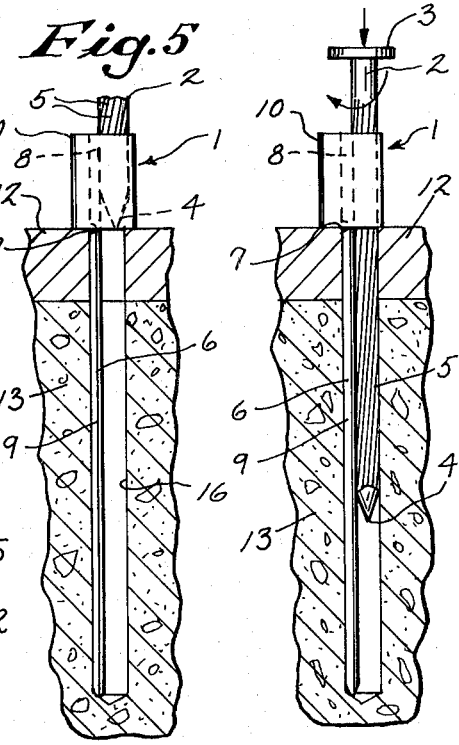

ANCHORING OF MATERIAL TO CONCRETE

| U.S. PRIOR ART OF INTEREST | | |
|---|---|---|
| 440,422 | Dietrich | Nov. 11, 1890 |
| 1,400,248 | Thomas | Dec. 13, 1921 |
| 1,407,999 | Harris | Feb. 28, 1922 |
| 1,695,113 | Langton et al. | Dec. 11, 1928 |
| 1,798,273 | Pleister | Mar. 31, 1931 |
| 2,878,668 | Starling et al. | Mar. 24, 1959 |
| 3,974,621 | Stang | Aug. 17, 1976 |
| 4,275,637 | Herb et al. | Jun. 30, 1981 |

Background and Summary of the Invention

This invention relates to anchoring of material to concrete.

Whenever building contractors or others need to anchor material, such as wood to concrete, it is important that the anchoring device be relatively inexpensive and that it holds the two elements together firmly and permanently. Powered stud drivers which drive a nail into the elements have been in use for quite some time, but it has been found that the concrete may tend to mushroom, leaving the nail loose. Wedging devices, such as those shown in some of the above-listed patents, have also been proposed, but these tend to be complex in construction and expensive to manufacture.

The present invention is based on a simplified anchor for firmly connecting wood or the like to concrete. The anchor includes a pair of connector elements. One element comprises a fluted concrete nail having the usual head and is made or hard metal. The other element comprises a headless pin of soft malleable metal having a notch spaced from adjacent one end to form a top portion. The tip of the nail is initially overlappingly joined to the notched top portion of the pin by an encircling retaining band. A hole is drilled through the wood and into the concrete to be joined and to a depth equal to the bottom end of the pin below the notch. The pin is inserted into the hole and the nail is then driven into the hole alongside the pin. When the nail head engages the notched top portion of the pin, the pin breaks away at the notch. The nail is then driven further until its head is engaged with the wood surface and the upper pin tip. During driving, the nail cuts into and deforms the pin within the hole in a tightening action.

Brief Description of the Drawings

The accompanying drawings illustrate the best mode presently contemplated by the inventor for carrying out the invention.

In the drawings:

FIG. 1 is a side elevational view of my simplified anchor, with parts broken away and in section;

FIG. 2 is a transverse section taken on line 2—2 of FIG. 1;

FIG. 3 is a view showing drilling of the hole in the parts to be joined;

FIGS. 4 and 5 illustrate insertion of the pin into the hole;

FIG. 6 shows the nail being driven into the hole;

FIG. 7 illustrates the breaking away of the pin;

FIG. 8 illustrates the anchor in its final position; and

FIG. 9 is a transverse section of the final joint taken on line 9—9 of FIG. 8.

Description of the Preferred Embodiment

As shown in FIGS. 1 and 2, the concrete anchor 1 comprises a pair of generally straight-shanked connector elements. One element comprises a nail 2 having a head 3 and tip 4 joined by a shank having spiral flutes 5 on its surface. Nail 2 is made of very hard metal suitable for driving into concrete. The other element comprises a headless pin 6 of relatively soft malleable metal, such as welding rod. Pin 6 is provided with a notch 7 adjacent to but spaced from its upper end to provide top and bottom portions 8 and 9. It is contemplated that bottom pin portion 9 is about equal in length to nail 2, but of smaller diameter, and may or may not be pointed.

Nail 2 and pin 6 are initially joined by an encircling breakable retaining band 10 of any suitable material, such as plastic. The joined elements are so positioned that they are slightly overlapped longitudinally with top portion 8 of pin 6 being joined to the tip portion of nail 2, with the tip end of the nail being in a transverse plane 11 containing notch 7.

Anchor 1 is contemplated fo use in joining a body 12 of any desired material, such as wood, to a body 13 of concrete. As shown in FIG. 3, a drill 14 with bit 15 is first used to drill a hole 16, such as 3/16" into the loose assembly of bodies 12 and 13. Hole 16 is of lesser diameter than the sum of the diameters of nail 2 and pin 6, and is shown as larger in diameter than pin 6. Hole 16 extends through wood body 12 and into concrete body 13, where it bottoms. Hole 16 is also of a depth at least equal to the length of nail 2 and bottom portion 9 of pin 6 below notch 7. This may be 1¼" or any other suitable length as desired, depending on the thickness of the materials.

In the event a hole is drilled all the way through the concrete, the nail should preferably be of a length about equal to the thickness of the wood-concrete assembly.

Referring to FIGS. 4 and 5, and in the present embodiment, anchor 1 is first manipulated to insert the lower end of pin 6 loosely into hole 16 until it reaches the bottom thereof, at which point notch 7 and nail tip 4 and the lower edge of band 10 will be at the top surface of wood body 12. A hammer (not shown) is then used to drive nail 2 into hole 16. As shown in FIG. 6, driving of the nail causes it to twist or rotate, due to flutes 5, and also causes it to longitudinally pass through band 10 and down alongside pin 6. When nail head 3 reaches and engages the top end of pin 6, top pin portion 8 automatically breaks away from portion 9 at notch 7, carrying with it band 10. In some instances, band 10 may be crushed instead. The remaining top end 17 of portion 9 will be flush with the surface of wood body 12. Final driving of nail 2 brings head 3 into engagement with body 12, as shown in FIG. 8.

Because nail 2 is of hard metal while pin 6 is made of soft malleable metal, the driving of nail 2 alongside pin 6 in the confined space of hole 16 threads the nail into the pin and causes pin 6 to be progressively crushed and deformed and tightly confined against the wall of hole 16. See FIG. 9. This provides the desired anchoring which simply yet effectively locks all the elements together into the desired final assembly.

Various modes of carrying out the invention are contemplated as being within the scope of the following claims particularly pointing out and distinctly claiming the subject matter which is regarded as the invention.

I claim:

1. For use in joining a body of wood or the like to a body of concrete wherein said bodies are initially disposed in loose engagement and a hole has been drilled through said wood and into said concrete, and anchor comprising:
   (a) a pair of generally straight-sided connector elements,
   (b) the first of said elements comprising a hard metal nail having a head and tip joined by a spirally fluted shank,
   (c) the second of said elements comprising a headless pin of soft malleable metal,
   (d) a notch disposed in said pin adjacent to but spaced from the upper pin end to separate the pin into top and bottom portions,
   (e) said nail and the said top portion of said pin being disposed in overlapping longitudinal position with the tip of said nail being in a transverse plane containing said notch,
   (f) and a breakable retaining band encircling and holding the overlapping portions of said nail and pin together,
   (g) the construction being such that upon insertion of said pin into the drilled hole and then driving of said nail into the hole alongside said pin, said top pin portion automatically breaks away at said notch upon engagement by said nail head, and said nail threads into said bottom portion of said pin where said pin is progressively crushingly deformed and confined between said nail and the wall of the hole to lock the bodies together.

2. The anchor of claim 1 wherein the sum of the diameters of said nail and pin is greater than the diameter of the drilled hole.

3. The anchor of claim 1 or 2 wherein the diameter of said pin is less than the diameter of the drilled hole.

4. The anchor of claim 3 wherein the length of said bottom portion of said pin below said notch is about equal to the depth of the drilled hole.

5. The method of joining a loose assemblage of bodies of wood or the like and concrete, comprising the steps of:
   (a) drilling a hole of a desired depth through said wood and into said concrete,
   (b) providing an anchor comprising:
      (1) a hard metal nail having a head and tip joined by a spirally fluted shank,
      (2) a headless pin of soft malleable metal having a notch disposed adjacent to but spaced from the upper pin end to separate the pin into top and bottom portions,
      (3) said nail and the top portion of said pin being disposed in overlapping longitudinal position with the tip of said nail being in a transverse plane containing said notch,
      (4) and a breakable retaining band encircling and holding the overlapping portions of said nail and pin together,
      (5) the sum of the diameters of said nail and pin being greater than the diameter of said drilled hole, with the diameter of said pin being less than the diameter of said drilled hole,
      (6) the length of said bottom portion of said pin below said notch being about equal to the depth of said drilled hole,
   (c) inserting said pin loosely into said hole so that said notch is at the surface of said wood body,
   (d) driving said nail longitudinally through said band and into said hole alongside said pin so that said nail rotatingly and progressively threads into and deforms and crushes said pin so that it is tightly confined against the wall of said hole,
   (e) causing said top pin portion to break away at said notch by driving said nail head against said pin so that said top pin portion falls away,
   (f) and continuing to drive said nail into said hole until said nail head engages said wood body.

6. An assemblage of wood or the like and concrete joined together in accordance with the method of claim 5.

* * * * *